(12) United States Patent
Eckel et al.

(10) Patent No.: US 6,583,204 B1
(45) Date of Patent: Jun. 24, 2003

(54) FLAME RESISTANT THERMOSTABLE POLYCARBONATE ABS MOULDING COMPOUNDS

(75) Inventors: Thomas Eckel, Dormagen (DE); Dieter Wittmann, Leverkusen (DE); Jörn Stölting, Köln (DE); Michael Zobel, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/856,026

(22) PCT Filed: Nov. 4, 1999

(86) PCT No.: PCT/EP99/08412

§ 371 (c)(1),
(2), (4) Date: May 16, 2001

(87) PCT Pub. No.: WO00/29476

PCT Pub. Date: May 25, 2000

(30) Foreign Application Priority Data

Nov. 18, 1998 (DE) .......................... 198 53 108

(51) Int. Cl.⁷ ..................... C08K 5/526; C08K 5/523; C08K 5/5333
(52) U.S. Cl. ................. 524/127; 524/126; 524/128
(58) Field of Search ................ 524/126, 127, 524/128

(56) References Cited

U.S. PATENT DOCUMENTS

| | | | |
|---|---|---|---|
| 5,061,745 A | 10/1991 | Wittmann et al. | 524/139 |
| 5,204,394 A | 4/1993 | Gosens et al. | 524/125 |
| 5,672,645 A | 9/1997 | Eckel et al. | 524/127 |
| RE36,188 E | 4/1999 | Gosens et al. | 524/125 |

FOREIGN PATENT DOCUMENTS

| | | |
|---|---|---|
| EP | 0 697 441 | 2/1996 |
| EP | 0 829 517 | 3/1998 |
| EP | 0 869 150 | 10/1998 |
| EP | 0 747 424 | 8/2000 |

*Primary Examiner*—Peter Szekely
(74) *Attorney, Agent, or Firm*—Joseph C. Gil; Aron Preis

(57) ABSTRACT

Thermoplastic moulding composition comprising at least 2 components chosen from the group consisting of aromatic poly(ester)carbonates, graft polymers of one or more vinyl monomers on one or more graft bases having a glass transition temperature of <10° C., thermoplastic vinyl (co) polymer and polyalkylene terephthalate and 0.5 to 20 parts by wt. phosphorus compound of the general formula (I).

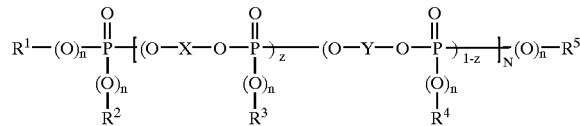

14 Claims, No Drawings

FLAME RESISTANT THERMOSTABLE POLYCARBONATE ABS MOULDING COMPOUNDS

The present invention relates to polycarbonate-ABS moulding compositions which have been given a flame-resistant treatment with phosphorus compounds and have an excellent profile of mechanical properties, a high heat distortion point and good processing properties, U.S. Pat. No. 5,061,745 describes moulding compositions of aromatic polycarbonate, graft polymer and monophosphate. Although these mixtures show good flow properties, the heat distortion point is often inadequate because of the high plasticizing effect of the monophosphates.

EP-A-0 640 655 describes moulding compositions of aromatic polycarbonate, styrene-containing copolymers and graft polymers which can be given a flame-resistant treatment with monomeric and/or oligomeric phosphorus compounds. Due to the presence of the monomeric phosphates, the required heat distortion point level often cannot be achieved.

EP-A 747 424 describes the use of a combination of phosphate having a molecular weight of approximately 500 to 2,000 and phosphate having a molecular weight of approximately 2,300 to 11,000 as flameproofing agents in thermoplastic resins, a large number of thermoplastic resins being listed. EP-A-0363608 describes flame-resistant polymer mixtures of aromatic polycarbonate, styrene-containing copolymer or graft copolymer and oligomeric phosphates as flameproofing additives. For some applications, such as, for example, mouldings inside components of housings, the heat distortion point of these mixtures is often inadequate.

The object of the present invention is therefore to prepare flame-resistant polycarbonate-ABS moulding compositions which have an excellent heat distortion point, in addition to good processing properties. With this combination of properties, the materials are particularly suitable for housings in current-conducting components, since high exposure to heat is to be expected in this case.

It has now been found, surprisingly, that flame-resistant moulding compositions which give shaped articles with a very good profile of mechanical properties and an outstanding heat distortion point, coupled with good processing properties, are obtained by using the phosphorus compounds according to the invention, which are distinguished in their structure by different structural units.

The present invention relates to thermoplastic moulding compositions comprising at least 2 components chosen from the group consisting of aromatic poly(ester)carbonates, graft polymers of one or more vinyl monomers on one or more graft bases having a glass transition temperature of <10° C., thermoplastic vinyl (co)polymer and polyalkylene terephthalate and 0.5 to 20 parts by wt. phosphorus compound of the general formula (I)

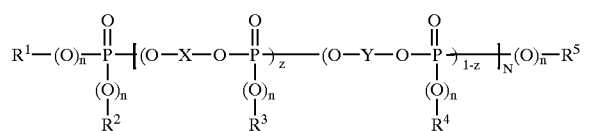

wherein

X and Y represent a mono- or polynuclear aromatic radical having 6 to 30 C atoms and X and Y differ from one another, $R^1$, $R^2$, $R^3$, $R^4$ and $R^5$ independently of one another denote optionally halogenated $C_1$–$C_8$-alkyl, or $C_5$–$C_6$-cycloalkyl, $C_6$–$C_{20}$-aryl or $C_7$–$C_{12}$-aralkyl, in each case optionally substituted by halogen and/or $C_1$–$C_4$-alkyl, z denotes 0.05 to 0.95, preferably 0.15 to 0.85, n independently of one another denote 0 or 1, preferably 1, and N denotes 0.5 to 30.

The present invention preferably relates to flame-resistant thermoplastic moulding compositions comprising A) 5 to 95, preferably 10 to 90 parts by wt., particularly preferably 20 to 80 parts by wt. aromatic polycarbonate and/or polyester-carbonate B) 1 to 60, preferably 1 to 40 parts by wt., particularly preferably 2 to 30 parts by wt. of at least one graft polymer of
  B.1 5 to 95, preferably 20 to 60 wt. % of one or more vinyl monomers on
  B.2 5 to 95, preferably 40 to 80 wt. % of one or more graft bases having a glass transition temperature of <10° C., preferably 0° C., particularly preferably <−20° C., C) 0 to 50, preferably 1 to 30, particularly preferably 2 to 25 parts by wt. thermoplastic vinyl (co)polymer and/or thermoplastic polyalkylene terephthalate D) 0.5 to 20 parts by wt., preferably 1 to 18 parts by wt., particularly preferably 2 to 15 parts by wt. of at least one phosphorus compound of the general formula (I)

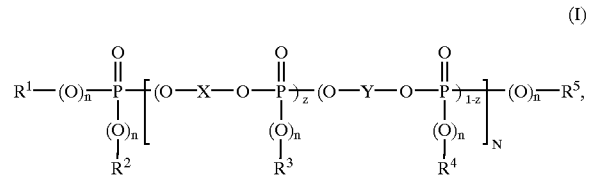

wherein

X and Y represent a mono- or polynuclear aromatic radical having 6 to 30 C atoms and X and Y differ from one another, $R^1$, $R^2$, $R^3$, $R^4$ and $R^5$ independently of one another denote optionally halogenated $C_1$–$C_8$-alkyl, or $C_5$–$C_6$-cycloalkyl, $C_6$–$C_{20}$-aryl or $C_7$–$C_{12}$-aralkyl, in each case optionally substituted by halogen and/or $C_1$–$C_4$-alkyl, z denotes 0.05 to 0.95, preferably 0.15 to 0.85, n independently of one another denote 0 or 1, preferably 1, and N denotes 0.5 to 30

E) 0.05 to 5 parts by wt., preferably 0.1 to 1 part by wt., particularly preferably 0.1 to 0.5 part by wt. fluorinated polyolefin.

Component A

Aromatic polycarbonates and/or aromatic polyester-carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610 and DE-OS 3 832 396; for the preparation of aromatic polyester-carbonates e.g. DE-OS 3 077 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the phase boundary process, optionally using chain stoppers, for example monophenols, and optionally using branching agents which are trifunctional or more than trifunctional, for example triphenols or tetraphenols.

Diphenols for the preparation of the aromatic polycarbonates and/or aromatic polyester-carbonates are preferably those of the formula (II)

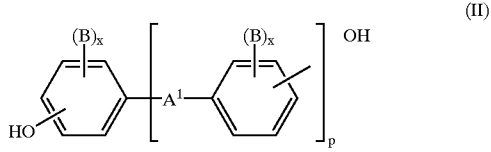

(II)

wherein $A^1$ is a single bond, $C_1$–$C_5$-alkylene, $C_2$–$C_5$-alkylidene, $C_5$–$C_6$-cycloalkylidene, —O—, —SO—, —CO—, —S—, —SO$_2$—, $C_6$–$C_{12}$-arylene, which can be fused with further aromatic rings optionally containing heteroatoms, or a radical of the formula

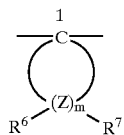

(III)

or a radical of the formula (IV)

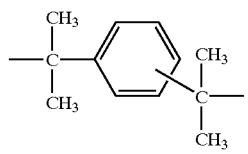

(IV)

B independently of one another are $C_1$–$C_8$-alkyl, preferably $C_1$–$C_4$-alkyl, in particular methyl, halogen, preferably chlorine and/or bromine, $C_6$–$C_{10}$-aryl, preferably phenyl, $C_7$–$C_{12}$-aralkyl or phenyl-$C_1$–$C_4$-alkyl, preferably benzyl, x in each case independently of one another are 0, 1 or 2, p is 1 or 0 and $R^6$ and $R^7$ can be chosen individually for each Z and independently of one another denote hydrogen or $C_1$–$C_6$-alkyl, preferably hydrogen, methyl and/or ethyl, Z denotes carbon and m denotes an integer from 4 to 7, preferably 4 or 5, with the proviso that on at least one atom Z $R^6$ and $R^7$ simultaneously are alkyl.

Preferred diphenols are hydroquinone, resorcinol, 4,4'-dihydroxydiphenyl, bis-(hydroxyphenyl)-$C_5$–$C_6$-alkanes, bis-(hydroxyphenyl)-$C_1$–$C_6$-cycloalkanes, bis-(hydroxyphenyl)ethers, bis-(hydroxyphenyl)sulfoxides, bis-(hydroxyphenyl)ketones, bis(hydroxyphenyl)sulfones and α,α-bis-(hydroxyphenyl)-diisopropyl-benzenes and derivatives thereof brominated on the nucleus and/or chlorinated on the nucleus.

Particularly preferred diphenols are 4,4'-diphenylphenol, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or -chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-Bis-(4-hydroxyphenyl)-propane (bisphenol A) is particularly preferred.

The diphenols can be employed individually or as any desired mixtures.

The diphenols are known from the literature or obtainable by processes known from the literature.

Examples of chain stoppers which are suitable for the preparation of the thermoplastic, aromatic polycarbonates are phenol, p-chlorophenol, p-tert-butylphenol or 2,4,6-tribromophenol, and also long-chain alkylphenols, such as 4-(1,3-tetramethylbutyl)-phenol according to DE-OS 2 842 005, or monoalkylphenols or dialkylphenols having a total of 8 to 20 C atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain stoppers to be employed is in general between 0.5 mol % and 10 mol %, based on the molar sum of the particular diphenols employed.

The thermoplastic, aromatic polycarbonates have average weight-average molecular weights ($M_w$, measured e.g. by ultracentrifuge or scattered light measurement) of 10,000 to 200,000, preferably 20,000 to 80,000.

The thermoplastic, aromatic polycarbonates can be branched in a known manner, and in particular preferably by incorporation of 0.05 to 2.0 mol %, based on the sum of the diphenols employed, of compounds which are ≧trifunctional, for example those with ≧three phenolic groups.

Both homopolycarbonates and copolycarbonates are suitable. To prepare copolycarbonates according to the invention as component A, it is also possible to employ 1 to 25 wt. %, preferably 2.5 to 25 wt. % (based on the total amount of diphenols to be employed) of polydiorganosiloxanes with hydroxy-aryloxy end ,groups. These are known (see, for example, from U.S. Pat. No. 3,419,634) or can be prepared by processes known from the literature. The preparation of copolycarbonates containing polydiorganosiloxane is described e.g. in DE-OS 3 334 782.

Preferred polycarbonates are, in addition to bisphenol A homopolycarbonates, the copolycarbonates of bisphenol A with up to 15 mol %, based on the molar sum of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester-carbonates are preferably the diacid dichlorides of isophthalic acid, terephthalic acid, diphenyl ether-4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester-carbonates.

Possible chain stoppers for the preparation of the aromatic polyester-carbonates are, in addition to the monophenols already mentioned, also chlorocarbonic acid esters thereof, and the acid chlorides of aromatic monocarboxylic acids, which can optionally be substituted by $C_1$–$C_{22}$-alkyl groups or by halogen atoms, as well as aliphatic $C_2$–$C_{22}$-monocarboxylic acid chlorides.

The amount of chain stoppers is in each case 0.1 to 10 mol %, based on the moles of diphenols in the case of the phenolic chain stoppers and on the moles of dicarboxylic acid dichlorides in the case of monocarboxylic acid chloride chain stoppers.

The aromatic polyester-carbonates can also contain incorporated aromatic hydroxycarboxylic acids.

The aromatic polyester-carbonates can be both linear and branched in a known manner (in this context see likewise DE-OS 2 940 024 and DE-OS 3 007 934).

Branching agents which can be used are, for example, carboxylic acid chlorides which are 3-functional or more than 3-functional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol % (based on the dicarboxylic acid dichlorides employed) or phenols which are 3-functional or more than 3-functional, such as phloroglucinol, 4,6-dimethyl-2,4,6-tri-(4-hydroxyphenyl)-heptene, 2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane and 1,4-bis-[4,4'-dihydroxytriphenyl)-methyl]-benzene, in amounts of 0.01 to 1.0 mol %, based on the diphenols employed. Phenolic branching agents can be initially introduced into the reaction vessel with the diphenols, and acid chloride branching agents can be introduced together with the acid dichlorides.

The content of carbonate structural units in the thermoplastic, aromatic polyester-carbonates can vary as desired.

The content of carbonate groups is preferably up to 100 mol %, in particular up to 80 mol %, particularly preferably up to 50 mol %, based on the sum of ester groups and carbonate groups.

Both the ester and the carbonate content of the aromatic polyester-carbonates can be in the form of blocks or randomly distributed in the polycondensate.

The relative solution viscosity ($\eta_{rel}$) of the aromatic poly(ester)carbonates is in the range from 1.18 to 1.4, preferably 1.22 to 1.3 (measured on solutions of 0.5 g poly(ester)carbonate in 100 ml methylene chloride solution at 25° C.).

The thermoplastic, aromatic polycarbonates and polyester-carbonates can be employed by themselves or in any desired mixture with one another.

Component B

Component B according to the invention comprises graft polymers. These include graft copolymers with rubber-elastic properties which are substantially obtainable from at least 2 of the following monomers: chloroprene, 1,3-butadiene, isoprene, styrene, acrylonitrile, ethylene, propylene, vinyl acetate and (meth)acrylic acid esters having 1 to 18 C atoms in the alcohol component; that is to say polymers such as are described e.g. in "Methoden der Organischen Chemie" (Houben-Weyl), vol. 14/1, Georg Thieme-Verlag, Stuttgart 1961, p. 393–406 and in C. B. Bucknall. "Toughened Plastics", Appl. Science Publishers, London 1977. Preferred polymers B are partly crosslinked and have gel contents of more than 20 wt. %, preferably more than 40 wt. %, in particular more than 60 wt. %.

Preferred graft polymers B include graft polymers of:

B.1 5 to 95, preferably 30 to 80 parts by wt. of a mixture of

B.1.1 50 to 99 parts by wt. styrene, α-methylstyrene, styrenes substituted on the nucleus by halogen or methyl, methyl methacrylate or mixtures of these compounds and B.1.2 1 to 50 parts by wt. acrylonitrile, methacrylonitrile, methyl methacrylate, maleic anhydride, $C_1$–$C_4$-alkyl- or phenyl-N-substituted maleimides or mixtures of these compounds on B.2 5 to 95, preferably 20 to 70 parts by wt. polymer based on diene and/or alkyl acrylate and having a glass transition temperature below –10° C., Preferred graft polymers B are e.g. bases B.2, such as polybutadiene, butadiene/styrene copolymers and acrylate rubbers, grafted with styrene and/or acrylonitrile and/or (meth)acrylic acid alkyl esters: i.e. copolymers of the type described in DE-OS 1 694 173 (=U.S. Pat. No. 3,564,077); polybutadienes, butadiene/styrene or butadiene/acrylonitrile copolymers, polyisobutenes or polyisoprenes grafted with acrylic or methacrylic acid alkyl esters, vinyl acetate, acrylonitrile, styrene and/or alkylstyrenes, such as are described e.g. in DE-OS 2 348 377 (=U.S. Pat. No. 3,919,353).

Particularly preferred polymers B are e.g. ABS polymers, such as are described e.g. in DE-OS 2 035 390 (=U.S. Pat. No. 3,644,574) or in DE-OS 2 248 242 (=GB-B 1 409 275).

Particularly preferred graft polymers B are obtainable by a grafting reaction of α 10 to 70, preferably 15 to 50, in particular 20 to 40 wt. %, based on graft polymer B, of at least one (meth) acrylic acid ester, or 10 to 70, preferably 15 to 50, in particular 20 to 40 wt. % of a mixture of 10 to 50, preferably 20 to 35 wt. %, based on the mixture, of acrylonitrile or (meth)acrylic acid ester and 50 to 90, preferably 65 to 80 wt. %, based on the mixture, of styrene as graft base B.1 on β 30 to 90, preferably 50 to 85, in particular 60 to 80 wt. %, based on graft polymer B, of a butadiene polymer with at least 50 wt. %, based on β, of butadiene radicals as graft base B.2.

The gel content of graft base β is in general at least 20 wt. %, preferably at least 40 wt. % (measured in toluene), the degree of grafting G is 0.15 to 0.55 and the average particle diameter $d_{50}$ of graft polymer B.2 is 0.05 to 2 μm, preferably 0.1 to 0.6 μm.

(Meth)acrylic acid esters α are esters of acrylic acid or methacrylic acid with monohydric alcohols having 1 to 18 C atoms. Methyl, ethyl and propyl methacrylate, n-butyl acrylate, t-butyl acrylate and t-butyl methacrylate are particularly preferred.

In addition to butadiene radicals, graft base β can contain up to 50 wt. %, based on of radicals of other ethylenically unsaturated monomers, such as styrene, acrylonitrile, esters of acrylic or methacrylic acid having 1 to 4 C atoms in the alcohol component (such as methyl acrylate, ethyl acrylate, methyl methacrylate or ethyl methacrylate), vinyl esters and/or vinyl ethers. The preferred graft base β consists of pure polybutadiene.

The degree of grafting G designates the weight ratio of grafted-on grafting monomer to graft base and has no dimensions.

The average particle size $d_{50}$ is the diameter above and below which in each case 50 wt. % of the particles lie. It can be determined by means of ultracentrifuge measurement (W. Scholtan, H. Lange, Kolloid. Z. und Z. Polymere 250 (1972), 782–796).

Particularly preferred polymers B are e.g. also graft polymers of

τ.20 to 90 wt. %, based on component B, of acrylate rubber having a glass transition temperature of ←20° C. as graft base B.2 and δ.10 to 80 wt. %, based on component B, of at least one polymerizable ethylenically unsaturated monomer as grafting monomer B.1.

The acrylate rubbers τ of polymers B are preferably polymers of acrylic acid alkyl esters, optionally with up to 40 wt. %, based on τ, of other polymerizable ethylenically unsaturated monomers. Preferred polymerizable acrylic acid esters include $C_1$–$C_8$-alkyl esters, for example methyl, ethyl, butyl, n-octyl and 2-ethyl-hexyl ester; halogenoalkyl esters, preferably halogeno-$C_1$–$C_8$-alkyl esters, such as chloroethyl acrylate, and mixtures of these monomers.

For crosslinking, monomers with more than one polymerizable double bond can be copolymerized. Preferred examples of crosslinking monomers are esters of unsaturated monocarboxylic acids having 3 to 8 C atoms and unsaturated monohydric alcohols having 3 to 12 C atoms or saturated polyols having 2 to 4 OH groups and 2 to 20 C atoms, such as e.g. ethylene glycol dimethacrylate or allyl methacrylate; polyunsaturated heterocyclic compounds, such as e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds containing at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and triallylbenzenes.

The amount of the crosslinking monomers is preferably 0.02 to 5, in particular 0.05 to 2 wt. %, based on graft base τ.

In the case of cyclic crosslinking monomers with at least 3 ethylenically unsaturated groups, it is advantageous to limit the amount to less than 1 wt. % of graft base τ.

Preferred "other" polymerizable ethylenically unsaturated monomers which can optionally be used, in addition to the acrylic acid esters, for the preparation of graft base τ are e.g. acrylonitrile, styrene, α-methylstyrene, acrylamides, vinyl $C_1$–$C_6$-alkyl ethers, methyl methacrylate and butadiene. Preferred acrylate rubbers as graft base τ are emulsion polymers which have a gel content of at least 60 wt. %.

Further suitable graft bases according to B.2 are silicone rubbers with grafting-active sites, such as are described in DE-OS 3 704 657, DE-OS 3 704 655, DE-OS 3 631 540 and DE-OS 3 631 539.

The gel content of graft base B.2 is determined at 25° C. in dimethylformnamide (M. Hoffmann. H. Kromer. R. Kuhn. Polymeranalytik I und II, Georg Thieme-Verlag, Stuttgart 1977).

Graft polymers B can be prepared by known processes, such as bulk, suspension, emulsion or bulk-suspension processes.

Since, as is known, during the grafting reaction the grafting monomers are not necessarily grafted completely on to the graft base, according to the invention graft polymers B are also understood as meaning those products which have been obtained by polymerization of the grafting monomers in the presence of the graft base.

The average particle size $d_{50}$ is the diameter above and below which in each case 50 wt. % of the particles lie. It can be determined by means of ultracentrifuge measurement (W. Scholtan, H. Lange, Kolloid. Z. und Z. Polymere 250 (1972), 782–1796).

Component C

Component C comprises one or more thermoplastic vinyl (co)polymers C.1 and/or polyalkylene terephthalates C.2.

Suitable vinyl (co)polymers C.1 are polymers of at least one monomer from the group consisting of vinylaromatics, vinyl cyanides (unsaturated nitriles), (meth)acrylic acid ($C_1$–$C_8$)-alkyl esters, unsaturated carboxylic acids and derivatives (such as anhydrides and imides) of unsaturated carboxylic acids. Particularly suitable (co)polymers are those of C.1.1 50 to 99, preferably 60 to 80 parts by wt. vinylaromatics and/or vinylaromatics substituted on the nucleus (such as, for example, styrene, α-methylstyrene, p-methylstyrene and p-chlorostyrene) and/or methacrylic acid ($C_1$–$C_8$)-alkyl esters (such as e.g. methyl methacrylate and ethyl methacrylate), and C.1.2 1 to 50, preferably 20 to 40 parts by wt. vinyl cyanides (unsaturated nitriles), such as acrylonitrile and methacrylonitrile, and/or (meth)acrylic acid ($C_1$–$C_8$)-alkyl esters (such as e.g. methyl methacrylate, n-butyl acrylate and t-butyl acrylate) and/or unsaturated carboxylic acids (such as maleic acid) and/or derivatives (such as anhydrides and imides) of unsaturated carboxylic acids (for example maleic anhydride and N-phenyl-maleimide).

(Co)polymers C.1 are resinous, thermoplastic and rubber-free.

The copolymer of C.1.1 styrene and C.1.2 acrylonitrile is particularly preferred.

(Co)polymers according to C.1 are known and can be prepared by free-radical polymerization, in particular by emulsion, suspension, solution or bulk polymerization. The (co)polymers preferably have molecular weights $\overline{M}_w$ (weight-average, determined by light scattering or sedimentation) of between 15,000 and 200,000.

The polyalkylene terephthalates of component C.2) are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 wt. %, based on the diol component, of ethylene glycol radicals and/or butane-1,4-diol radicals.

Preferred polyalkylene terephthalates can contain, in addition to terephthalic acid radicals, up to 20 mol %, preferably up to 10 mol %, of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexane-diacetic acid.

In addition to ethylene glycol radicals or butane-1,4-diol radicals, the preferred polyalkylene terephthalates can contain up to 20 mol %, preferably up to 10 mol % of other aliphatic diols having 3 to 12 C atoms or cycloaliphatic diols having 6 to 21 C atoms, e.g. radicals of propane-1,3-diol, 2-ethylpropane-1,3-diol, neopentylglycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxyphenyl)-propane (DE-OS 2 407 674, 2 407 776 and 2 715 932).

The polyalkylene terephthalates can be branched by incorporation of relatively small amounts of 3- or 4-hydric alcohols or 3- or 4-basic carboxylic acids, e.g. in accordance with DE-OS 1 900 270 and U.S. Pat. No. 3,692,744. Examples of preferred branching agents are trimesic acid, trimellitic acid, trimethylolethane and -propane and pentaerythritol.

Particularly preferred polyalkylene terephthalates are those which have been prepared solely from terephthalic acid and reactive derivatives thereof (e.g. dialkyl esters thereof) and ethylene glycol and/or butane-1,4-diol, and mixtures of these polyalkylene terephthalates.

Mixtures of polyalkylene terephthalates comprise 1 to 50 wt. %, preferably 1 to 30 wt. % polyethylene terephthalate and 50 to 99 wt. %, preferably 70 to 99 wt. % polybutylene terephthalate.

The polyalkylene terephthalates preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

Component D

The moulding compositions according to the invention comprise as flameproofing agents at least one phosphorus compound of the formula (I)

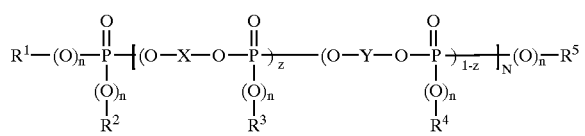

In the formula, the radicals $R^1$, $R^2$, $R^3$, $R^4$, $R^5$, X, Y, n, N and z have the abovementioned meaning.

The aromatic groups in the definition of $R^1$, $R^2$, $R^3$, $R^4$ and $R^6$ can in turn independently of one another be substituted by halogen and/or alkyl groups, preferably chlorine, bromine and/or $C_1$–$C_4$-alkyl. Particularly preferred aryl radicals are cresyl, phenyl, xylenyl, propylphenyl or butylphenyl and the corresponding brominated and chlorinated derivatives thereof.

N represents values from 0.3 to 30, preferably an average value of 0.3 to 20, particularly preferably 0.5 to 10, in particular 0.5 to 6. In the case of mixtures of phosphorus compounds, N can assume the abovementioned average values. This mixture can comprise monophosphorus compounds and/or oligomeric and/or polymeric phosphorus compounds. In the case where N=0, the formula (I) describes monophosphorus compounds.

X and Y in the formula (I) are in each case different and represent a mono- or polynuclear aromatic radical having 6 to 30 C atoms. Preferred radicals are derived from diphenols according to formula (II).

Preferred diphenols are hydroquinone, resorcinol, 4,4'-dihydroxydiphenyl, bis-(hydroxyphenyl)-$C_1$–$C_5$-alkanes, bis-(hydroxyphenyl)-$C_1$–$C_6$-cycloalkanes, bis-(hydroxyphenyl)ethers, bis-(hydroxyphenyl)sulfoxides, bis-(hydroxyphenyl)ketones, bis-(hydroxyphenyl)sulfones and α,α-bis-(hydroxyphenyl)-diisopropyl-benzenes and derivatives thereof brominated on the nucleus and/or chlorinated on the nucleus.

Particularly preferred diphenols are 4,4'-diphenylphenol, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or -chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

Particularly preferred diphenols are bisphenol A, resorcinol, hydroquinone, dihydroxydiphenyl and dihydroxydiphenyl sulfone.

Mixtures of phosphorus compounds of the formula (I), preferably mono- and/or oligomeric phosphates of the formula (I), with average N values of 0.5 to 10, in particular 0.5 to 6, are particularly preferably employed as component D.

The monomeric and oligomeric phosphorus compounds of the formula (I) are preferably chosen in the mixture such that a synergistic action is achieved. The mixture in general comprises 10 to 90 wt. % oligomeric and 90 to 10 wt. % mono-phosphorus compounds of the formula (I). Preferably, the monomeric phosphorus compounds and/or monophosphate compounds are mixed in the range of 12 to 50, in particular 14 to 40, especially preferably 15 to 40 wt. % with the complementary amount of oligomeric phosphate compounds.

Possible monophosphorus compounds, i.e. N=0, are compounds such as tributyl phosphate, tris-(2-chloroethyl) phosphate, tris-(2,3-dibromopropyl)phosphate, triphenyl phosphate, tricresyl phosphate, diphenyl cresyl phosphate, diphenyl octyl phosphate, diphenyl 2-ethylcresyl phosphate, tri-(isopropylphenyl)phosphate, halogen-substituted aryl phosphates, methylphosphonic acid dimethyl ester, methylphosphonic acid diphenyl ester, phenylphosphonic acid diethyl ester, triphenylphosphine oxide or tricresylphosphine oxide.

The phosphorus compounds according to component D are generally known compounds of organic chemistry or can be prepared in a manner analogous to known methods (cf. e.g. Ullmanns Encyklopädie der Technischen Chemie, vol. 18, p. 301 et seq., 179; Houben-Weyl, Methoden der Organischen Chemie, vol. 12/1, p.43; Beilstein, vol. 6, p. 177), by employing at least 2 different dihydroxy compounds, e.g. bisphenols and hydroquinone, for the build-up.

Component E

The fluorinated polyolefins E are of high molecular weight and have glass transition temperatures above −30° C., as a rule above 100° C., fluorine contents preferably of 65 to 76, in particular 70 to 76 wt. % and average particle diameters $d_{50}$ of 0.05 to 1,000, preferably 0.08 to 20 μm. In general, the fluorinated polyolefins E have a density of 1.2 to 2.3 g/cm$^3$. Preferred fluorinated polyolefins E are polytetrafluoroethylene, polyvinylidene fluoride and tetrafluoroethylene/hexa-fluoropropylene and ethylene/tetrafluoroethylene copolymers. The fluorinated polyolefins are known (cf. "Vinyl and Related Polymers" by Schildknecht, John Wiley & Sons, Inc., New York, 1962, pages 484–494; "Fluorpolymers" by Wall, Wiley-Interscience, John Wiley & Sons, Inc., New York, volume 13, 1970, pages 623–654; "Modern Plastics Encyclopaedia", 1970–1971, volume 47, no. 10 A, October 1970, McGraw-Hill, Inc., New York, pages 134 and 774; "Modern Plastics Encyclopaedia", 1975–1976, October 1975, volume 52, no. 10 A, McGraw-Hill, Inc., New York, pages 27, 28 and 472 and U.S. Pat. Nos. 3,671,487, 3,723,373 and 3,838,092).

They can be prepared by known processes, thus, for example, by polymerization of tetrafluoroethylene in an aqueous medium with a catalyst which forms free radicals, for example sodium peroxydisulfate, potassium peroxydisulfate or ammonium peroxydisulfate, under pressures of 7 to 71 kg/cm$^2$ and at temperatures of 0 to 200° C., preferably at temperatures of 20 to 100° C. (For further details see e.g. U.S. Pat. No. 2,393,967). Depending on the use form, the density of these materials can be between 1.2 and 2.3 g/cm$^3$ and the average particle size can be between 0.5 and 1,000 μm.

Fluorinated polyolefins E which are preferred according to the invention are tetrafluoroethylene polymers with average particle diameters of 0.05 to 20 μm, preferably 0.08 to 10 μm, and a density of 1.2 to 1.9 g/cm$^3$, and are preferably employed in the form of a coagulated mixture of emulsions of the tetrafluoroethylene polymers E with emulsions of the graft polymers B.

Suitable fluorinated polyolefins E which can be employed in powder form are tetrafluoroethylene polymers with average particle diameters of 100 to 1,000 μm and densities of 2.0 g/cm$^3$ to 2.3 g/cm$^3$.

To prepare a coagulated mixture of B and E, an aqueous emulsion (latex) of a graft polymer B is first mixed with a finely divided emulsion of a fluorinated polyolefin E; suitable emulsions of fluorinated polyolefins usually have solids contents of 30 to 70 wt. %, in particular 50 to 60 wt. %, preferably 30 to 35 wt. %.

The amounts stated in the description of component B do not include the content of the graft polymer for the coagulated mixture of graft polymer and fluorinated polyolefins.

The equilibrium ratio of graft polymer B to fluorinated polyolefin E in the emulsion mixture is 95:5 to 60:40. The emulsion mixture is coagulated in a known manner, for example by spray drying, freeze drying or coagulation by means of addition of inorganic or organic salts, acids or bases or organic water-miscible solvents, such as alcohols or ketones, preferably at temperatures of 20 to 150° C., in particular 50 to 100° C. If necessary, the product can be dried at 50 to 200° C., preferably 70 to 100° C.

Suitable tetrafluoroethylene polymer emulsions are commercially available products and are available, for example, as Teflon 30 N from DuPont.

The moulding compositions according to the invention can comprise at least one of the conventional additives, such as lubricants and mould release agents, nucleating agents, antistatics, stabilizers and dyestuffs, pigments and/or reinforcing materials. Possible inorganic reinforcing materials are glass fibres, optionally cut or ground, glass beads, glass balls, reinforcing material in leaflet form, such as kaolin, talc, mica or carbon fibres. Cut or ground glass fibres, preferably with a length of 1 to 10 mm and a diameter of <20 μm, are preferably employed as the reinforcing material in an amount of 1 to 40 parts by wt.; the glass fibres are preferably treated on the surface.

The moulding compositions according to the invention can moreover comprise at least one polar compound of at least one of the metals of main groups 1 to 5 or sub-groups 1 to 8 of the periodic table with at least one element chosen from the group consisting of oxygen, sulfur, boron, carbon, phosphorus, nitrogen, hydrogen and silicon, as a very finely divided inorganic powder. The polar compound preferably employed is an oxide or hydroxide, preferably $TiO_2$, $SiO_2$, $SnO_2$, ZnO, boehmite, $ZrO_2$, $Al_2O_3$, iron oxides and their mixtures and doped compounds, particularly preferably boehmite or $TiO_2$, with an average particle diameter of <200 nm, preferably 0.1–100 nm, particularly preferably 1–50 nm.

The moulding compositions according to the invention can comprise one or more further flameproofing agents which optionally have a synergistic action. Further flameproofing agents which are mentioned by way of example are phosphorus compounds which differ from component D, organic halogen compounds, such as decabromobisphenyl ether and tetrabromobisphenol, inorganic halogen compounds, such as ammonium bromide, nitrogen compounds, such as melamine and melamine-formaldehyde resins, inorganic hydroxide compounds, such as Mg and Al hydroxide, and inorganic compounds, such as antimony oxides, barium metaborate, hydroxoantimonate, zirconium oxide, zirconium hydroxide, molybdenum oxide, ammonium molybdate, zinc borate, ammonium borate and tin oxide, as well as siloxane compounds. These flameproofing agents are in general added in an amount of up to 20 wt. % (based on the total moulding composition).

The moulding compositions according to the invention comprising components A to E and optionally further known additives, such as stabilizers, dyestuffs, pigments, lubricants and mould release agents, nucleating agents, nanoparticles and antistatics and reinforcing materials and flameproofing agents, are prepared by mixing the particular constituents in a known manner and subjecting the mixture to melt compounding and melt extrusion at temperatures of 200° C. to 300° C. in conventional units, such as internal kneaders, extruders and twin-screw extruders, component E preferably being employed in the form of the coagulated mixture already mentioned.

Mixing of the individual constituents can be carried out in a known manner both successively and simultaneously, and in particular both at about 20° C. (room temperature) and at a higher temperature.

The moulding compositions of the present invention can be used for the production of all types of shaped articles. In particular, shaped articles can be produced by injection moulding. Examples of shaped articles which can be produced are: housing components of all types, e.g. for domestic appliances such as juice presses, coffee machines and mixers, or for office machines, such as monitors, printers or copiers, or cover sheets for the building sector and components for the motor vehicle sector. They can furthermore be employed in the field of electrical engineering, because they have very good electrical properties.

The moulding compositions according to the invention can furthermore be used, for example, for the production of the following shaped articles or mouldings:

Interior fittings for railway vehicles, hub caps, housings for electrical equipment containing small transformers, housings for equipment for data transmission and transfer, housings and linings for medical purposes, massage equipment and housings therefor, toy vehicles for children, flat wall elements, housings for safety devices, rear spoilers, thermally insulated transportation containers, devices for housing or care of small animals, mouldings for sanitary and bath fittings, cover gratings for ventilator openings, mouldings for garden and equipment sheds and housings for garden equipment.

The moulding compositions are particularly suitable for the production of mouldings where particularly high heat distortion point requirements are imposed on the plastics employed.

Another form of processing is the production of shaped articles by thermoforming from previously produced sheets or films.

The present invention therefore also provides the use of the moulding compositions according to the invention for the production of all types of shaped articles, preferably those mentioned above, and the shaped articles made of the moulding compositions according to the invention.

EXAMPLES

Component A

A1 Linear polycarbonate based on bisphenol A with a relative solution viscosity of 1.278, measured in $CH_2Cl_2$ as the solvent at 25° C. in a concentration of 0.5 g/100 ml.

A2 Linear polycarbonate based on bisphenol A with a relative solution viscosity of 1.202, measured in $CH_2Cl_2$ as the solvent at 25° C. in a concentration of 0.5 g/100 ml.

Component B

Graft polymer of 40 parts by wt. of a copolymer of styrene and acrylonitrile in a weight ratio of 73:27 on 60 parts by wt.

particulate crosslinked polybutadiene rubber (average particle diameter $d_{50}=0.4$ μm), prepared by emulsion polymerization.

Component C

Styrene/acrylonitrile copolymer with a styrene/acrylonitrile weight ratio of 72:28 and an intrinsic viscosity of 0.55 dl/g (measurement in dimethylformamide at 20° C.).

Component D

D1

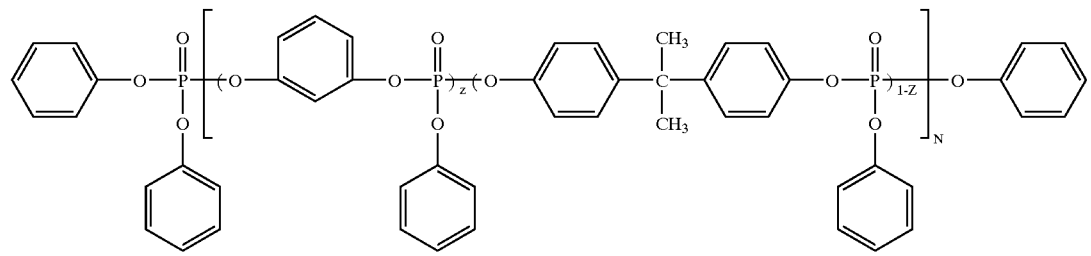

Z = 0.5 N = 1.2

D2

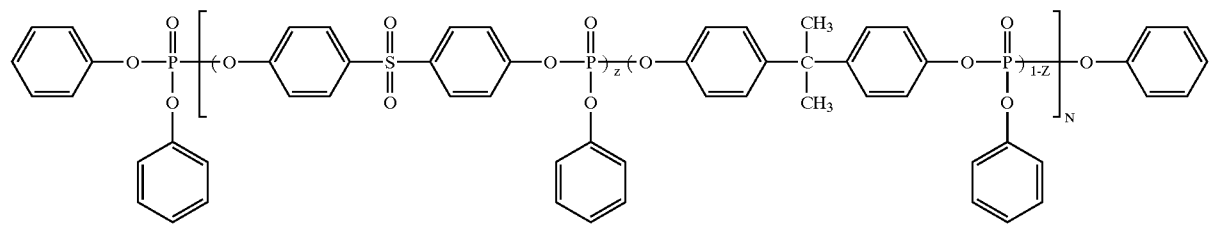

Z = 0.5 N = 1.1

D3 (Comparison)
m-Phenylene-bis(di-phenyl phosphate), Fyrolflex® RDP from Akzo.

Component E

Tetrafluoroethylene polymer as a coagulated mixture of an SAN graft polymer emulsion according to component B in water and a tetrafluoroethylene polymer emulsion in water. The weight ratio of graft polymer B to tetrafluoroethylene polymer E in the mixture is 90 wt. % to 10 wt. %. The tetrafluoroethylene polymer emulsion has a solids content of 60 wt. %, and the average particle diameter is between 0.05 and 0.5 μm. The SAN graft polymer emulsion has a solids content of 34 wt. % and an average latex particle diameter of 0.4 μm.

Preparation of E

The emulsion of the tetrafluoroethylene polymer (Teflon 30 N from DuPont) is mixed with the emulsion of the SAN graft polymer B and the mixture is stabilized with 1.8 wt. %, based on the polymer solid, of phenolic antioxidants. The mixture is coagulated at 85 to 95° C. with an aqueous solution of $MgSO_4$ (Epsom salt) and acetic acid at pH 4 to 5 and filtered and the residue is washed until practically free from electrolytes, subsequently freed from most of the water by centrifugation and then dried to a powder at 100° C. This powder can then be compounded with the further components in the units described.

Preparation and Testing of the Moulding Compositions According to the Invention Components A to E are mixed on a 3 1 internal kneader. The shaped articles are produced on an injection moulding machine, type Arburg 270 E at 260° C.

The notched impact strength is determined by the method ISO 180 1 A on bars of dimensions 80×10×4 $mm^3$ at room temperature.

The Vicat B heat distortion point is determined in accordance with DIN 53 460.

The stress cracking properties are investigated on bars of dimensions 80×10×4 $mm^3$, material temperature 260° C. A mixture of 60 vol. % toluene and 40 vol. % isopropanol is used as the test medium. The test specimens are pre-extended by means of a circular arc template and kept simultaneously in the test medium at room temperature for 5 min. The pre-extension $\delta_x$ is 0.2–2.4%. The stress cracking properties are evaluated via the fracture as a function of the pre-extension and the exposure time.

The compositions of the materials tested and the data obtained are summarized in the following table.

TABLE 1

Composition and properties of the polycarbonate-ABS moulding compositions

| Example | 1 Comparison | 2 | 3 |
|---|---|---|---|
| Components [parts by wt] | | | |
| A 1 | 42.2 | 42.2 | 42.2 |
| A 2 | 26.2 | 26.2 | 26.2 |
| B | 6.8 | 6.8 | 6.8 |
| C | 9.3 | 9.3 | 9.3 |

TABLE 1-continued

Composition and properties of the polycarbonate-ABS moulding compositions

| Example | 1 Comparison | 2 | 3 |
|---|---|---|---|
| D 1 | — | 12.0 | — |
| D 2 | — | — | 12.0 |
| D 3 | 12.0 | — | — |
| E | 4.2 | 4.2 | 4.2 |
| Mould release agent | 0.4 | 0.4 | 0.4 |
| Properties: | | | |
| Vicat B 120 [° C.] | 95 | 104 | 110 |
| Notched impact strength [kJ/m$^2$] | 35 | 39 | 37 |
| Melt viscosity at 260° C./shear rate 1,000 cm$^{-1}$ [Pa.s] | 130 | 127 | 132 |
| ESC properties | | | |
| 5 min/2.0% | — | BR 1:52 | — |
| 5 min/1.8% | BR 3:05 | — | BR 5:00 |

It can be seen from the table that the flame-resistant moulding compositions according to the invention show a very good property combination of the mechanical properties, in particular an improvement in the resistance to stress cracking, notched impact strength and heat distortion point. This is all the more surprising since, in spite of the sometimes significantly higher heat distortion point, the melt viscosity does not increase at a processing temperature of 260° C., but remains at the level of the comparison experiment. It is also clear here that by using phosphates built up from different structural units, various properties, such as mechanical or thermal properties, can be improved in a controlled manner without a deterioration occurring in the processing properties,

What is claimed is:

1. Thermoplastic moulding composition comprising at least 2 components chosen from the group consisting of aromatic poly(ester)carbonates, graft polymers of one or more vinyl monomers on one or more graft bases having a glass transition temperature of <10° C., thermoplastic vinyl (co)polymer and polyalkylene terephthalate and 0.5 to 20 parts by wt. phosphorus compound of the general formula (I)

$$R^1-(O)_n-\overset{O}{\underset{\underset{R^2}{(O)_n}}{P}}-[(O-X-O-\overset{O}{\underset{\underset{R^3}{(O)_n}}{P}})_z-(O-Y-O-\overset{O}{\underset{\underset{R^4}{(O)_n}}{P}})_{1-z}]_N(O)_n-R^5$$

wherein
  X and Y represent a mono- or polynuclear aromatic radical having 6 to 30 C atoms, and X and Y differ from one another,
  $R^1$, $R^2$, $R^3$, $R^4$ and $R^5$ independently of one another denote optionally halogenated $C_1$–$C_8$-alkyl, or $C_1$–$C_6$-cycloalkyl, $C_6$–$C_{20}$-aryl or $C_7$–$C_{12}$-aralkyl, in each case optionally substituted by halogen and/or $C_1$–$C_4$-alkyl,
  Z denotes 0.05 to 0.95, preferably 0.15 to 0.85,
  n independently of one another denote 0 or 1, preferably 1, and N denotes 0.5 to 30
as a further component.

2. Thermoplastic moulding compositions comprising
  A. 5 to 95 parts by wt. aromatic polycarbonate or polyester-carbonate,
  B. 0.5 to 60 parts by wt. graft polymer of
    B.1 5 to 95 wt. % of one or more vinyl monomers on
    B.2 5 to 95 wt. % of one or more graft bases having a glass transition temperature of <–10° C.,
  C. 0 to 50 parts by wt. thermoplastic vinyl (co)polymer and/or polyalkylene terephthalate
  D. 0.5 to 20 parts by wt. of a phosphorus compound of the formula (I)

$$R^1-(O)_n-\overset{O}{\underset{\underset{R^2}{(O)_n}}{P}}-[(O-X-O-\overset{O}{\underset{\underset{R^3}{(O)_n}}{P}})_z-(O-Y-O-\overset{O}{\underset{\underset{R^4}{(O)_n}}{P}})_{1-z}]_N(O)_n-R^5$$

wherein
  X and Y represent a mono- or polynuclear aromatic radical having 6 to 30 C atoms, and X and Y differ from one another,
  $R^1$, $R^2$, $R^3$, $R^4$ and $R^5$ independently of one another denote optionally halogenated $C_1$–$C_8$-alkyl, or $C_5$–$C_6$-cycloalkyl, $C_6$–$C_{20}$-aryl or $C_7$–$C_{12}$-aralkyl, in each case optionally substituted by halogen and/or $C_1$–$C_4$-alkyl,
  z denotes 0.05 to 0.95, preferably 0.15 to 0.85
  n independently of one another denote 0 or 1, preferably 1, and
  N denotes 0.5 to 30
  E. 0.05 to 5 parts by wt. fluorinated polyolefin,
the sum of the parts by wt. of all the moulding composition components being 100.

3. Moulding compositions according to claim 1, wherein the phosphorus compounds of the formula (I) have an average N of 0.3 to 20.

4. Molding compositions according to claim 1 wherein the phosphorus compound is a mixture of phosphorus compounds with average values for N of 0.5 to 10.

5. Molding compositions according to claim 1 wherein in formula (I) X and Y are different and are derived from diphenols of the formula (II):

(II)

(structure: HO-aryl(B)$_x$-A$^1$-[aryl(B)$_x$-OH]$_p$)

wherein
  $A^1$ is a single bond, $C_1$–$C_5$-alkylene, $C_2$–$C_5$-alkylidene, $C_5$–$C_6$-cycloalkylidene, —O—, —SO—, —CO—, —S—, —SO$_2$—, $C_6$–$C_{12}$-arylene, optionally fused with further aromatic rings and further optionally containing heteroatoms, or a radical of the formula (III)

(structure with C, $R^6$, $R^7$, $(Z)_m$)

or a radical of the formula (IV)

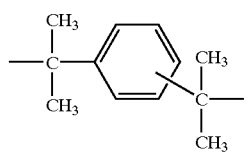
(IV)

B independently of one another are $C_1$–$C_8$-alkyl, halogen, $C_6$–$C_{10}$-aryl, $C_7$–$C_{12}$-aralkyl, x in each case independently of one another are 0, 1 or 2, p is 1 or 0, and $R^6$ and $R^7$ chosen individually for each Z and independently of one another denote hydrogen or $C_1$–$C_6$-alkyl, Z denotes carbon and m denotes an integer from 4 to 7, with the proviso that on at least one atom Z $R^6$ and $R^7$ simultaneously are alkyl.

6. Molding compositions according to claim 1 wherein X and Y in formula (I) are different and are derived from diphenols selected from the group consisting of hydroquinone, resorcinol, 4,4'-dihydroxydiphenyl, bis-(hydroxyphenyl)-$C_1$–$C_5$-alkanes, bis-(hydroxyphenyl)-$C_5$–$C_6$-cycloalkanes, bis-(hydroxyphenyl)ethers, bis-(hydroxyphenyl)sulfoxides, bis(hydroxyphenyl)ketones, bis-(hydroxyphenyl)sulfones and α,α-bis(hydroxyphenyl)-diisopropyl-benzenes and derivatives thereof brominated on the nucleus and/or chlorinated on the nucleus.

7. Molding compositions according to claim 1 which comprise 0.01 to 35 wt. %, based on the total molding composition, of at least one further flameproofing agent.

8. Molding compositions according to claim 2 comprising 10 to 90 parts by wt. component A, 1 to 40 parts by wt. component B and 1 to 18 parts by wt. component D.

9. Molding compositions according to claim 2 comprising 20 to 80 parts by wt. component A, 2 to 30 parts by wt. component B and 2 to 15 parts by wt. component D.

10. Molding compositions according to claim 2 wherein graft base B.2 is a diene rubber, acrylate rubber, silicone rubber or ethylene/propylene/diene rubber.

11. Molding compositions according to claim 1 further comprising a very finely divided compound having an average diameter of less than 200 nm of main groups 1 to 5 or sub-groups 1 to 8 of the periodic table with at least one element selected from the group consisting of oxygen, sulfur, boron, carbon, phosphorus, nitrogen, hydrogen and silicon.

12. Molding compositions according to claim 1 further comprising at least one additive from the group consisting of stabilizers, pigments, mould release agents, flow auxiliaries, inorganic reinforcing materials, nanoparticles and antistatics.

13. A method of using the molding composition of claim 1 for the production of shaped articles.

14. The shaped articles produced by the method of claim 13.

* * * * *